United States Patent
Kennedy

[11] Patent Number: 5,121,242
[45] Date of Patent: Jun. 9, 1992

[54] RETRO-REFLECTIVE OPTICAL TRANSCEIVER

[75] Inventor: William P. Kennedy, Littleton, Colo.

[73] Assignee: Martin Marietta Corporation, Bethesda, Md.

[21] Appl. No.: 650,223

[22] Filed: Feb. 4, 1991

[51] Int. Cl.⁵ .......................................... H04B 10/00
[52] U.S. Cl. ................................. 359/152; 359/170; 359/302; 359/364
[58] Field of Search ............... 359/152, 154, 156, 158, 359/159, 168, 170, 247, 169, 302, 364

[56] References Cited

U.S. PATENT DOCUMENTS

| | | | |
|---|---|---|---|
| 4,063,083 | 12/1977 | Cathey et al. | 359/163 |
| 4,131,791 | 12/1978 | Lego, Jr. | 359/169 |
| 4,143,263 | 3/1979 | Eichweber | 359/170 |
| 4,662,003 | 4/1987 | Eichweber | 359/169 |
| 4,717,913 | 1/1988 | Elger | 340/825.54 |
| 4,721,363 | 1/1988 | Inoue | 359/43 |
| 4,864,222 | 9/1989 | Aoshima et al. | 324/96 |
| 4,887,310 | 12/1989 | Meyzonnette et al. | 359/170 |

Primary Examiner—Edward L. Coles, Sr.
Assistant Examiner—Rafael Bacares

[57] ABSTRACT

A retro-reflective transceiver provides optical communications by reflecting light transmitted by a distant source. The transceiver has a corner cube reflector with a truncated apex that serves as a transmissive aperture. A portion of the incoming light passes through the aperture in the corner cube reflector to a receiver where information encoded on the incoming light beam can be detected. The remainder of the light beam is reflected back toward the source in a direction substantially parallel to the incoming light beam by the three mutually perpendicular, reflective faces of the corner cube reflector. An optical switch (e.g. ferro-electric light crystal material) located in front of the corner cube reflector is used to modulate the intensity of the reflected beam to transmit information to the source.

29 Claims, 2 Drawing Sheets

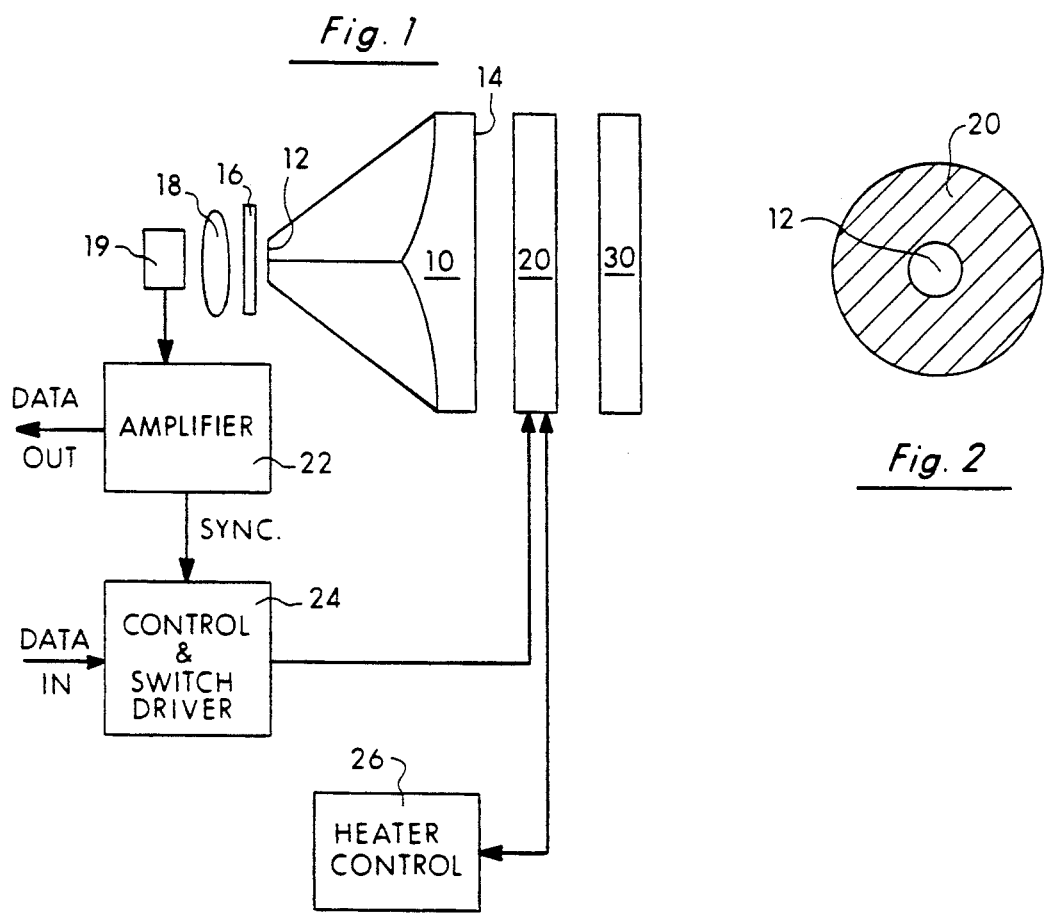
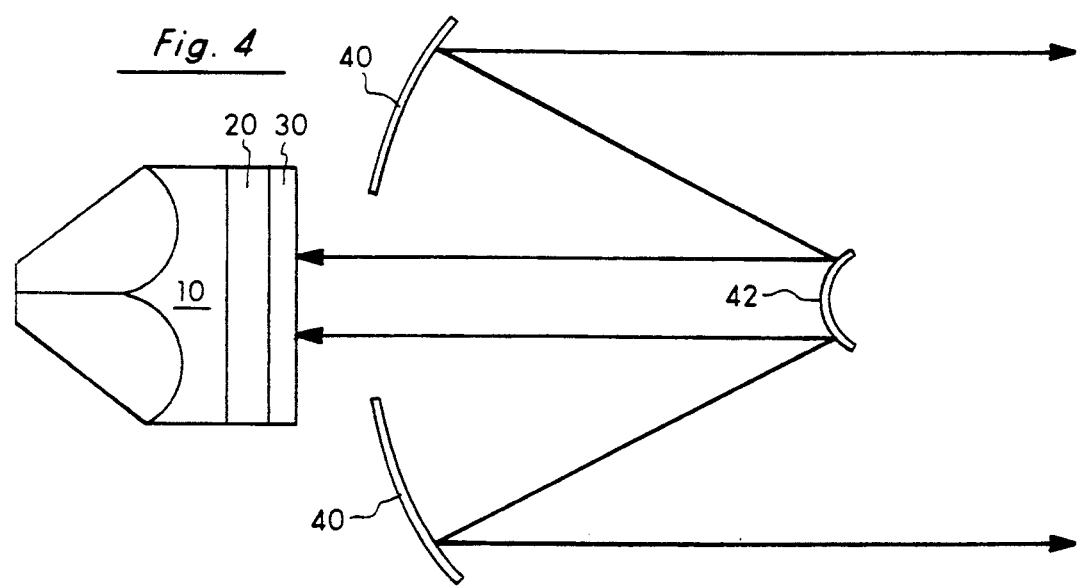

RETRO-REFLECTIVE OPTICAL TRANSCEIVER

BACKGROUND OF THE INVENTION

1. Field of the Invention

The present invention relates generally to field of optical communications systems. More specifically, the present invention discloses an optical transceiver using a corner cube reflector with a transmissive aperture, a receiver aligned with this aperture, and an optical switch to modulate the intensity of the reflected beam.

2. Statement of the Problem

A wide variety of optical communications systems are known in the prior art. However, these systems have typically suffered a number of shortcomings. Chief among these has been the need for gimbals and other pointing and tracking devices to maintain the necessary optical link between the transmitter and receiver. This adds substantial cost, complexity, and weight. Another major shortcoming has been the substantial power requirements needed to operate an optical transmitter that generates its own output beam. This tends to substantially limit the portability and/or range of optical transmitters.

It has long been known that corner cube reflectors (having three mutually perpendicular reflective surfaces) have the property of producing a reflected ray that is parallel to, but in the opposite direction from an incident ray, regardless of the direction of the incident ray within the field of view of the corner cube reflector. Klein & Furtak, Optics, p. 183 (Wiley, 2nd ed., 1986). This principle has been applied in the past to help solve the pointing and tracking problems associated with optical communications systems.

The prior art contains several examples of optical communications systems. A number of devices and processes have been invented in the past relating to use of corner cube reflectors in optical communications, including the following:

| Inventor | Patent No. | Issue Date |
| --- | --- | --- |
| Cathey, et al. | 4,063,083 | Dec. 13, 1977 |
| Lego | 4,131,791 | Dec. 26, 1978 |
| Eichweber | 4,143,263 | March 6, 1979 |
| Eichweber | 4,662,003 | Apr. 28, 1987 |
| Elger | 4,717,913 | Jan. 5, 1988 |
| Inoue | 4,721,363 | Jan. 26, 1988 |
| Aoshima, et al. | 4,864,222 | Sept. 5, 1989 |
| Meyzonnette, et al. | 4,887,310 | Dec. 12, 1989 |

Cathey, et al., disclose an optical communications system using a series of light-coupled interfaces along the path of a light beam. Each interface assembly includes light sensitive and/or light emitting elements for extracting and/or adding information to the light beam.

Lego discloses a search-and-locate system. A search beacon of laser radiation is transmitted by the search station. The person to be located has a locator unit with a corner cube retro-reflector 30 and a separate photodiode 46. The corner cube retro-reflector 30 reflects a portion of the search beacon back to the search station where it is detected by a receiving apparatus. The locator unit includes a reflection control shutter 32 which enables a message to be transmitted to the search station by modulating the reflected beam. As shown in FIG. 6, the control shutter 32 can made implemented by means of a layer of material 86 which rotates the plane of polarization of the transmitted light. This layer of material is placed between two polarizing filters 88 and 90. The photodiode 46 and demodulator circuit 52 can be used to control the shutter 32 to reflectively respond only to a search beacon transmitting a predetermined code.

Eichweber (U.S. Pat. No. 4,143,263) discloses an optical transceiver system involving a retro-reflector 8, a separate photo-electric sensor 2, and an optical modulator 7. The optical modulator 7 unmasks the retro-reflector 8 to reflect the input light beam 1 back to its source if the input beam has a predetermined coding. The shutter can also be used to modulate the return beam to transmit data to the source. Subsequent U.S. Pat. No. 4,662,003 provides additional improvements to this basic system. However, once again, a separate photo-electric sensor 6 is used.

Elger discloses a data telemetry system. Each transponder has a set of PIN diodes for receiving signals, and a set of infrared emitting diodes for transmitting signals.

Inoue discloses a temperature control device for a liquid crystal optical shutter. The unit includes a light source 16, heaters 17 and 19, a liquid crystal optical shutter 18, a focussing lens 20, control substrates 21a and 21b, and temperature sensing thermistors 22 and 30. When a power switch is activated, the heater 19 is continuously energized until the temperature of the shutter 18 reaches a predetermined temperature.

Aoshima, et al., disclose a voltage detector made of an electro-optic material whose refractive index is changed by the voltage to be measured. An end portion of this material has a corner-cube shape.

Meyzonnette, et al., disclose a retro-reflective transceiver which operates by inducing a wavelength shift in the return beam. This shift is detected by the master transceiver in a heterodyne scheme. Data is encoded onto the return beam by means of a Bragg cell or an acousto-optic device.

3. Solution to the Problem

None of the prior art references uncovered in the search show an optical transceiver having a truncated corner cube reflector in which a portion of the incoming beam passes through the corner cube reflector to a receiver located behind the truncated apex, and a portion of the beam is reflected back to the source through an optical switch that permits information to be transmitted back to the source by modulating the intensity of the reflected beam.

SUMMARY OF THE INVENTION

This invention provides a retro-reflective transceiver for optical communications using reflected light transmitted by a distant source. The transceiver has a corner cube reflector with a truncated apex that serves as a transmissive aperture. A portion of the incoming light passes through the aperture in the corner cube reflector to a receiver where information encoded on the incoming light beam can be detected. The remainder of the light beam is reflected back toward the source in a direction substantially parallel to the incoming light beam by the three mutually perpendicular, reflective faces of the corner cube reflector. An optical switch (e.g. ferro-electric liquid crystal material) located in front of the corner cube reflector modulates the intensity of the reflected beam to transmit information to the source.

A primary object of the present invention is to provide an optical transceiver that does not require sophisticated tracking or pointing apparatus.

Another object of the present invention is to provide an optical transceiver having minimal power requirements.

Yet another object of the present invention is to provide an optical transceiver that is compact, lightweight, and readily portable.

These and other advantages, features, and objects of the present invention will be more readily understood in view of the following detailed description and the drawings.

BRIEF DESCRIPTION OF THE DRAWINGS

The present inVention can be more readily understood in conjunction with the accompanying drawings, in which:

FIG. 1 is a simplified schematic diagram showing the major components of the optical transceiver.

FIG. 2 is a front planar view of the liquid crystal optical switch having a transmissive central region.

FIG. 4 is a simplified schematic diagram of an alternative embodiment in which light-gathering reflectors are used in increase the beam inception area.

DETAILED DESCRIPTION OF THE INVENTION

Figure 3A:
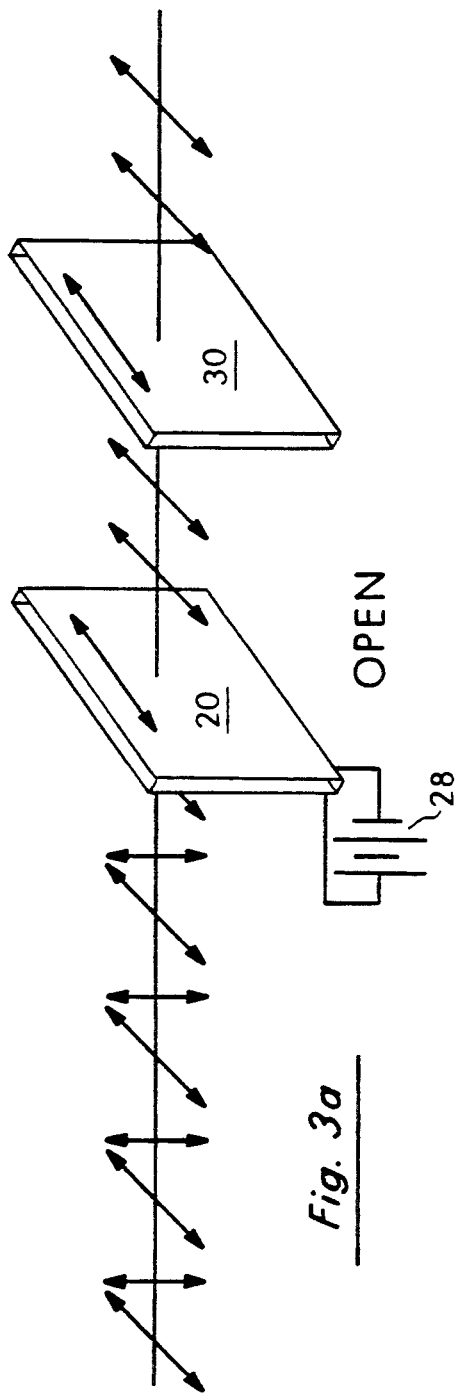
FIGS. 3a and 3b are simplified schematic diagrams showing the manner in which an optical switch and polarizing filter are employed in combination to modulate the beam reflected by the corner cube reflector.

Turning to FIG. 1., a schematic overview of the present invention is shown. The central element of the transceiver is the corner cube reflector 10. As with conventional corner cube reflectors, this has three mutually perpendicular reflective surfaces. In a conventional corner cube reflector, an incoming light ray entering the right end 14 of the corner cube reflector 10 will be reflected within the corner cube reflector 10 and emerge as a reflected ray having a direction exactly opposite to that of the incoming ray, but at a lateral offset with respect to the incoming ray. In other words, an incoming ray within the field of view of a corner cube reflector will be reflected back to its source, regardless of the direction of the source. The angular acceptance range of an corner cube reflector is typically between +30 degrees and −30 degrees from its central axis.

The present transceiver is intended for use in association with a distant master station that transmits a beam of light. A portion of that beam is then reflected by the transceiver back to the master station. Information can be transmitted from the master station to the transceiver by encoding data on the beam of light (e.g. by amplitude modulation) at its origin at the master station. Conversely, information can be transmitted from the transceiver to the master station by modulating the intensity of the reflected beam.

The present invention involves a modification of a conventional corner cube reflector in that the apex or corner of the reflector is truncated to create a transmissive surface 12 at the area of intersection of the three reflective surfaces of the corner cube reflector 10. The transmissive surface allows a portion of the light rays entering the corner cube reflector 10 to pass through the corner cube reflector 10. These light rays strike a photo-detector (e.g. a PIN diode, or avalanche photodiode ("APD")) used as a receiver 19 to detect the incoming beam and convert information encoded thereon into an electrical signal. An amplifier 22 and/or other signal processing apparatus can be used for further processing of this signal into a desired form. A selective filter 16 (e.g. an interference filter) can be interposed between the transmissive region 12 of the corner cube reflector 10 and the receiver 19 to selectively limit the optical characteristics (e.g. wavelength) of the light rays detected by the receiver 19. A lens 18 can also be used to gather and focus these light rays on the receiver 19 to increase sensitivity.

The remaining incoming light rays from the master station that do not pass through the transmissive surface 12 are reflected by the corner cube reflector 10 back toward the master station, as explained above. An optical switch 20 is positioned in optical alignment with the front 14 of the corner cube reflector 10. The purpose of this optical switch 20 is to modulate the intensity of the reflected beam, and thereby transmit information back to the master station. This can be accomplished most simply by a mechanical shutter. To achieve higher data transfer rates, an electronically controlled shutter or optical switch is necessary. For example, the optical switch 20 can take the form of a thin disk of liquid crystal material whose optical transmissivity can be changed between substantially clear and substantially opaque by adjusting the voltage applied by the control and switch driver circuitry 24.

In one embodiment, the optical switch 20 is simply a disk with uniform properties. However, this requires that the optical switch 20 must remain "open"(i.e. transmissive) under normal circumstances, since a "closed" optical switch would block incoming light rays from reaching the receiver 19. One compromise that largely eliminates this problem is an optical switch with a two-part construction as shown in FIG. 2. A central transmissive region 12 allows incoming light rays to reach the receiver 19 at all times. The surrounding switchable region 20 can be changed between "open" and "closed" to modulate the reflected beam, as previously discussed.

The present invention supports simplex communications between the transceiver and the master station, assuming the transceiver and master station both use the same type of modulation (e.g. amplitude modulation) to encode information. This requires a synchronization or lock-out mechanism between the receiver and transmitter circuitry to insure that the transceiver does not attempt to transmit while data is being received from the master station. Duplex communications would be possible if the master station used a different type of modulation (e.g. frequency modulation) than that used by the transceiver.

Figure 3B:
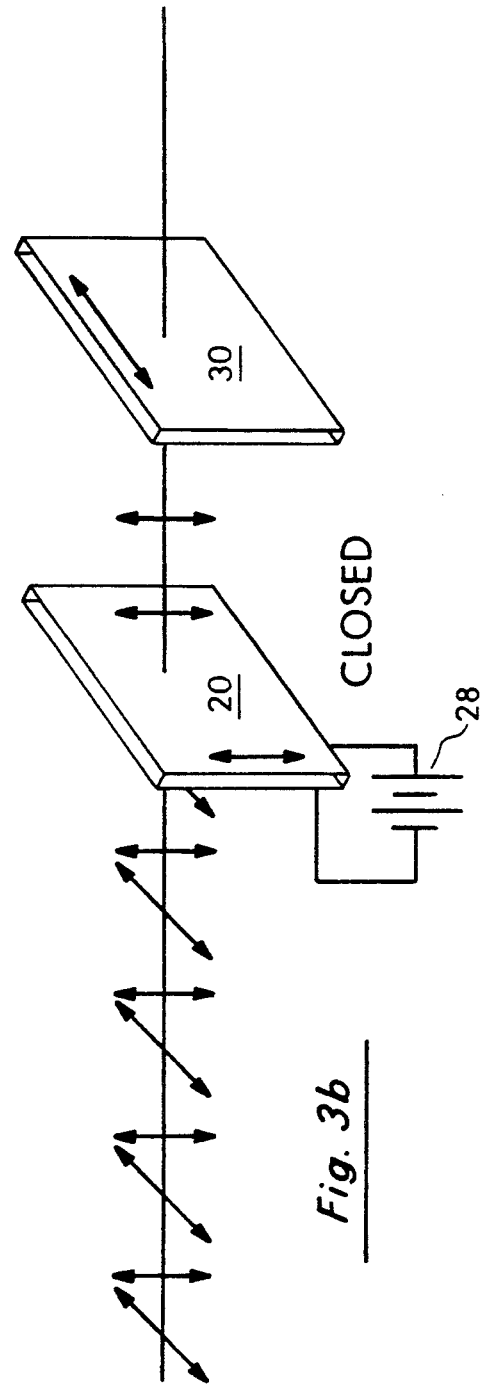

FIGS. 1 and 3 illustrate the preferred embodiment of the present invention in which a polarized filter 30 is used in combination with an optical switch 20 comprised of a layer of ferro-electric liquid crystal material. The polarized filter 30 is a conventional quarter wave plate that transmits light having a predetermined angle of polarization and blocks light rays having a polarization substantially perpendicular to this angle of polarization. The ferro-electric liquid crystal optical switch acts as a polarized filter having an angle of polarization that can be rotated by changing the electrical potential placed across the material, as shown in FIG. 3. When the angle of polarization of the optical switch 20 is adjusted to coincide with the angle of polarization of the polarized filter 30 (FIG. 3a) the beam returned to the master station has its maximum intensity. At the opposite extreme, when the angle of polarization of the optical switch 20 is shifted 90 degrees from that of the polarized filter 30, the beam returned to the master station has its minimum intensity (FIG. 3b). Currently available ferro-electric liquid crystal optical switches offer speeds of operation of up to 10 KHz with 10:1 minimum contrast between open and closed positions. At 1 KHz, the contrast ratio is practically infinite (700:1). A heater 26 is employed to maintain the ferro-electric liquid crystal material at an optimal temperature of about 45 degrees Centigrade.

FIG. 4 shows the optical transceiver 10, 20 and 30 in combination with light-gathering reflective mirrors 40 and 42 to increase the amount of light directed into the corner cube reflector 10. The reflected beam emerging from the corner cube reflector 10 retraces substantially the same path back toward the light source. Alternatively, one or more refractive optical elements can be used in place of the mirrors 40 and 42 shown in FIG. 4 to accomplish this result. Arrangements of this type are useful when dealing with a faint or distant light source. The disadvantage of this arrangement is that the field of view of the optical transceiver is greatly reduced, such that accurate location and tracking of the source may become a critical concern.

The above disclosure sets forth a number of embodiments of the present invention. Other arrangements or embodiments, not precisely set forth, could be practiced under the teachings of the present invention and as set forth in the following claims.

I claim:

1. A retro-reflective optical transceiver adapted to receive information encoded on incoming light rays transmitted by a distant source and transmit information to said source by encoding light rays reflected by said transceiver to said source, said transceiver comprising:
   a corner cube reflector having a first end adapted to receive said incoming light rays; three mutually perpendicular reflective faces adapted to reflect a portion of said incoming light rays back toward said source in a direction substantially parallel to said incoming light rays; and a substantially transmissive aperture adapted to permit a portion of said incoming light rays to pass through said corner cube reflector;
   receiver means adapted to receive said incoming light rays passing through said aperture and detect information encoded on said light rays; and
   an optical switch in optical alignment with said first end of said corner cube reflector, adapted to modulate the intensity of said light rays reflected by said corner cube reflector back toward said source.

2. The retro-reflective optical transceiver of claim 1, wherein said corner cube reflector further comprises a truncated apex at the area of intersection of said reflective faces, and said truncated apex forms said transmissive aperture.

3. The retro-reflective optical transceiver of claim 1, further comprising transmitter means adapted to control said optical switch to encode information on said reflected light rays.

4. The retro-reflective optical transceiver of claim 1, wherein said optical switch comprises a first polarized filter and a second polarized filter in optical alignment with said first polarized filter, the angle of polarization of at least one of said filters being adjustably controllable to permit information to be encoded on said re-flected light rays by adjusting the relative polarization of said filters.

5. The retro-reflective optical transceiver of claim 4, wherein at least one of said polarized filters is comprised of a ferro-electric liquid crystal material whereby the angle of polarization of said filter can be adjustably controlled by an electrical potential applied across said liquid crystal material.

6. The retro-reflective optical transceiver of claim 1, wherein said optical switch has a substantially transmissive region allowing at least a portion of said incoming light rays to pass through said optical switch and through said aperture of said corner cube reflector to said receiver means; and a switchable region adapted to modulate the intensity of said light rays reflected by said corner cube reflector back toward said source.

7. The retro-reflective optical transceiver of claim 1, further comprising a filter in optical alignment with said receiver means, adapted to transmit only incoming light rays having predetermined optical characteristics to said receiver means.

8. The retro-reflective optical transceiver of claim 1, wherein said receiver means comprises a PIN diode.

9. The retro-reflective optical transceiver of claim 1, further comprising an optical element adapted to focus incoming light rays passing through said transmissive aperture on said receiver means.

10. The retro-reflective optical transceiver of claim 1, further comprising telescope means adapted to gather and direct incoming light rays to said first end of said corner cube reflector.

11. The retro-reflective optical transceiver of claim 1, further comprising synchronization means adapted to facilitate simplex communications between said transceiver and said source by preventing said optical switch from transmitting information while said receiver means is receiving data.

12. A retro-reflective optical transceiver adapted to receive information encoded on incoming light rays transmitted by a distant source and transmit information to said source by encoding light rays reflected by said transceiver to said source, said transceiver comprising:
   a corner cube reflector having:
      (a) a first end adapted to receive said incoming light rays;
      (b) three mutually perpendicular reflective faces adapted to reflect a portion of said incoming light rays back toward said source in a direction substantially parallel to said incoming light rays; and
      (c) a truncated apex at the area of intersection of said reflective faces, said truncated apex providing a substantially transmissive aperture adapted to permit a portion of said incoming light rays to pass through said corner cube reflector;
   receiver means adapted to receive said incoming light rays passing through said aperture and detect information encoded on said light rays; and
   an optical switch in optical alignment with said first end of said corner cube reflector, said optical switch having a first transmissive region allowing at least a portion of said incoming light rays to pass through said optical switch and through said aperture of said corner cube reflector to said receiver means, and a second switchable region adapted to modulate the intensity of said light rays reflected by said corner cube reflector back toward said source.

13. The retro-reflective optical transceiver of claim 12, further comprising transmitter means adapted to control said optical switch to encode information on said reflected light rays.

14. The retro-reflective optical transceiver of claim 12, wherein said optical switch comprises a first polarized filter and a second polarized filter in optical alignment with said first polarized filter, the angle of polarization of at least one of said filters being adjustably controllable to permit information to be encoded on said reflected light rays by adjusting the relative polarization of said filters.

15. The retro-reflective optical transceiver of claim 14, wherein at least one of said polarized filters is comprised of a ferro-electric liquid crystal material whereby the angle of polarization of said filter can be adjustably controlled by an electrical potential applied across said liquid crystal material.

16. The retro-reflective optical transceiver of claim 12, further comprising a filter in optical alignment with said receiver means, adapted to transmit only incoming light rays having predetermined optical characteristics to said receiver means.

17. The retro-reflective optical transceiver of claim 12, wherein said receiver means comprises a PIN diode.

18. The retro-reflective optical transceiver of claim 12, further comprising an optical element adapted to focus incoming light rays passing through said transmissive aperture on said receiver means.

19. The retro-reflective optical transceiver of claim 12, further comprising telescope means adapted to gather and direct incoming light rays to said first end of said corner cube reflector.

20. The retro-reflective optical transceiver of claim 12, further comprising synchronization means adapted to facilitate simplex communications between said transceiver and said source by preventing said optical switch from transmitting information while said receiver means is receiving data.

21. A retro-reflective optical transceiver adapted to receive information encoded on incoming light rays transmitted by a distant source and transmit information to said source by encoding light rays reflected by said transceiver to said source, said transceiver comprising:
    a corner cube reflector having:
    (a) a first end adapted to receive said incoming light rays;
    (b) three mutually perpendicular reflective faces adapted to reflect a portion of said incoming light rays back toward said source in a direction substantially parallel to said incoming light rays; and
    (c) a truncated apex at the area of intersection of said reflective faces, said truncated apex providing a substantially transmissive aperture adapted to permit a portion of said incoming light rays to pass through said corner cube reflector;
    receiver means adapted to receive said incoming light rays passing through said aperture and detect information encoded on said light rays; and
    a polarized filter in optical alignment with said first end of said corner cube reflector, said filter being adapted to transmit light rays having a predetermined angle of polarization and to block light rays having a polarization substantially perpendicular to said predetermined angle of polarization;
    an optical switch in optical alignment with said first polarized filter and with said first end of said corner cube reflector, said optical switch being adapted to transmit light rays having a predetermined angle of polarization and to block light rays having a polarization substantially perpendicular to said angle of polarization, the angle of polarization of said optical switch being adjustably controllable to permit modulation of the intensity of said reflected light rays by adjusting the angle of polarization of said optical switch with respect to said polarized filter.

22. The retro-reflective optical transceiver of claim 21, further comprising transmitter means adapted to control said optical switch to encode information on said reflected light rays.

23. The retro-reflective optical transceiver of claim 21, wherein said adjustably controllable filter is comprised of a ferro-electric liquid crystal material whereby the angle of polarization of said filter can be adjustably controlled by an electrical potential applied across said liquid crystal material.

24. The retro-reflective optical transceiver of claim 21, wherein said optical switch has a substantially transmissive region allowing at least a portion of said incoming light rays to pass through said optical switch and through said aperture of said corner cube reflector to said receiver means; and a switchable region adapted to modulate the intensity of said light rays reflected by said corner cube reflector back toward said source.

25. The retro-reflective optical transceiver of claim 21, further comprising a filter in optical alignment with said receiver means, adapted to transmit only incoming light rays having predetermined optical characteristics to said receiver means.

26. The retro-reflective optical transceiver of claim 21, wherein said receiver means comprises a PIN diode.

27. The retro-reflective optical transceiver of claim 21, further comprising an optical element adapted to focus incoming light rays passing through said transmissive aperture on said receiver means.

28. The retro-reflective optical transceiver of claim 21, further comprising telescope means adapted to gather and direct incoming light rays to said first end of said corner cube reflector.

29. The retro-reflective optical transceiver of claim 21, further comprising synchronization means adapted to facilitate simplex communications between said transceiver and said source by preventing said optical switch from transmitting information while said receiver means is receiving data.

* * * * *